United States Patent
Kamenov

(10) Patent No.: US 8,230,836 B2
(45) Date of Patent: *Jul. 31, 2012

(54) MULTI-CYLINDER RECIPROCATING ROTARY ENGINE

(76) Inventor: Kamen George Kamenov, San Francisco, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 12/460,982

(22) Filed: Jul. 27, 2009

(65) Prior Publication Data

US 2011/0132315 A1  Jun. 9, 2011

(51) Int. Cl.
*F02B 53/00* (2006.01)
*F02B 53/02* (2006.01)
*F02B 75/00* (2006.01)
*F01C 1/07* (2006.01)
*F01C 9/00* (2006.01)
*F01C 1/063* (2006.01)
*F01C 1/00* (2006.01)
*F04C 18/00* (2006.01)
*F04C 2/00* (2006.01)

(52) U.S. Cl. ......... 123/245; 123/18 R; 123/241; 418/34; 418/36; 418/38

(58) Field of Classification Search ............... 123/245, 123/241, 18 R, 237; 418/34–38
See application file for complete search history.

(56) References Cited

U.S. PATENT DOCUMENTS

| | | | |
|---|---|---|---|
| 1,346,805 A | 7/1920 | Barber | |
| 2,367,676 A * | 1/1945 | Griffith | 418/36 |
| 2,816,527 A * | 12/1957 | Palazzo | 123/245 |
| 3,985,110 A * | 10/1976 | Doundoulakis | 123/245 |
| 3,989,011 A * | 11/1976 | Takahashi | 123/204 |
| 3,989,012 A * | 11/1976 | Doundoulakis | 123/245 |
| 4,068,985 A | 1/1978 | Baer | |
| 4,359,980 A * | 11/1982 | Somraty | 123/245 |
| 4,444,164 A * | 4/1984 | Tseng | 123/237 |
| 4,444,165 A * | 4/1984 | Tseng | 123/237 |
| 4,448,161 A * | 5/1984 | Tseng | 123/237 |
| 4,572,121 A * | 2/1986 | Chang | 123/203 |
| 4,599,976 A | 7/1986 | Meuret | |
| 4,823,743 A * | 4/1989 | Ansdale | 123/18 R |
| 4,884,532 A | 12/1989 | Tan | |
| 7,222,601 B1 * | 5/2007 | Kamenov | 123/245 |
| 7,441,534 B2 * | 10/2008 | Bastian | 123/245 |
| 7,931,006 B1 * | 4/2011 | Kamenov | 123/245 |
| 2011/0048369 A1 * | 3/2011 | Samuels | 123/244 |
| 2011/0108663 A1 * | 5/2011 | Westenberger | 123/200 |

* cited by examiner

*Primary Examiner* — Thai Ba Trieu

(57) ABSTRACT

A highly efficient, low weight-to-power ratio and adjustable high compression, gasoline or diesel internal combustion engine consisting of a multitude of cylindrical casings parallel to each other or aligned sequentially on one axle. Each casing having one radially extending vane affixed to a shaft rotatably mounted within the casing upon two end plates and one longitudinally extending wall affixed on the inside of the casing. The casing and/or the end plates equipped with plurality of ports and conduits which enable communication between interior chambers of the cylinders, allowing for intake of combustible air-fuel mixture and exhaust thereafter. Ignition means delivering a spark at the end of each working cycle. An extendable and adjustable connecting rod assembly converting the oscillating bi-directional rotary motion of the power output shaft into a continuous unidirectional motion of the main shaft. A self lubricating mechanism incorporated into the engine.

5 Claims, 18 Drawing Sheets

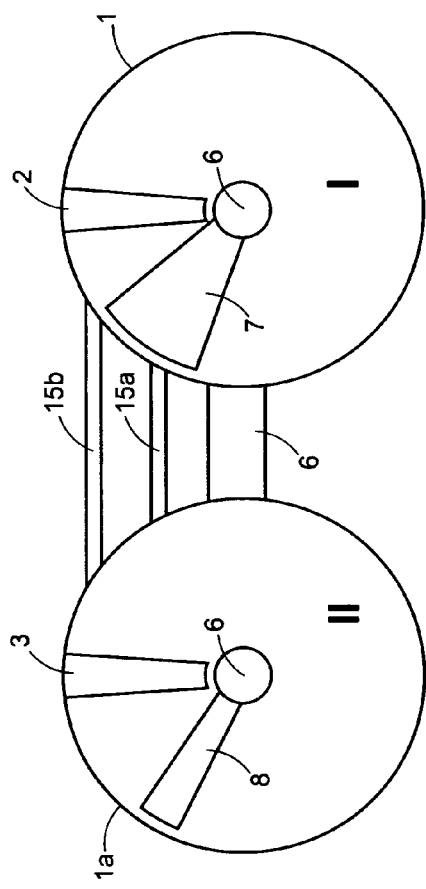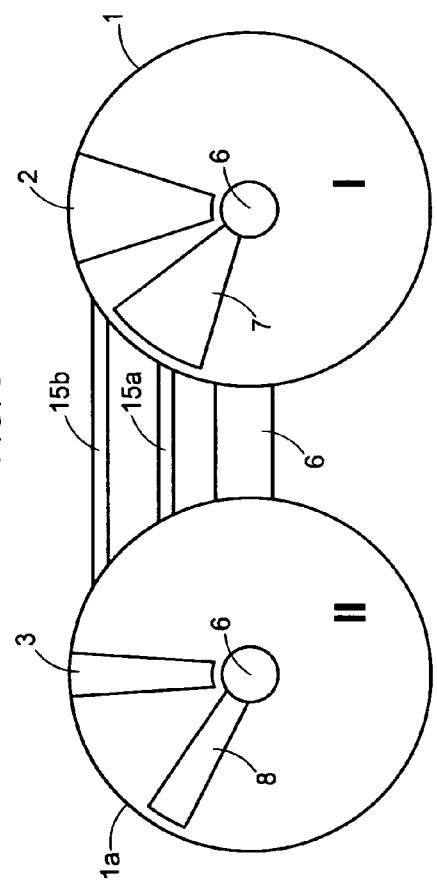

MULTI-CYLINDER RECIPROCATING ROTARY ENGINE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention is closely related to U.S. Pat. No. 7,222,601 issued on May 29, 2007. Some parts are almost the same, some are similar and other are different. However, it is a considerable improvement over the previous invention.

This invention relates to a rotatively reciprocating vane internal combustion engine having few moving parts, high efficiency, and a low weight-to-power ratio.

In an age of environmental concerns and waning natural resources, a lightweight, highly efficient, low fuel consumption engine has been vigorously sought.

In the past, attempts have been made to improve on reciprocating piston engines but their inherent complexity and high weight-to-power ratio has proven limiting. Although rotary or Wankel design engines have become relatively highly developed, they still exhibit daunting problems in rotor sealing and cost parameters. For example, the Wankel engine is difficult to manufacture, it has a short life, it has a problem of loosing its lubrication and seizing up. It has poor gas mileage, high oil consumption and high exhaust level. For every three turns of the working piston there is only one rotation of the main power output shaft, which results in a loss of energy and an excessive friction inside the working chambers between the piston and the casing.

Some attempts have been made to provide rotary vane engines, which abate some of the aforementioned problems. For example, U.S. Pat. No. 4,599,976 to Meuret discloses the utilization of a spherically shaped chamber and accordingly shaped vanes, which are used to sequentially compress and expand a combustive mixture. It should be noted, however, that the patented system has the following disadvantages.

In Meuret's patent the ratio between the volume of the chamber and the diameter of the vanes is constant. If the volume of the sphere chamber changes it automatically and proportionally changes the radius of the vanes. In a cylindrical chamber the volume of the chamber can be changed either by simply changing the length of the cylinder or by changing the radius of the cylinder. In each case there will be a different output even though the volume is the same. A cylindrical engine, compared to a spherical engine is much easier to manufacture and seal, and to open and repair.

Another example of a prior art attempt to overcome some of the disadvantages of existing engines is the U.S. Pat. No. 4,884,532 to Tan, which teaches an extremely complex swinging piston internal combustion engine. While Tan has made certain admirable advantages, his device suffers from the following disadvantages.

The Tan engine is big and bulky. There is no power-to-weight ratio advantage over the conventional engine. It would be difficult to manufacture and repair it. It would be difficult to balance it and it would only work as a diesel engine.

A further example of a prior art attempt is the U.S. Pat. No. 1,346,805 issued to Barber. Barber discloses a rotatably reciprocating vane internal combustion engine comprising: a water-jacketed, double-walled cylindrical casing allowing for cooling fluid to pass through it; the casing equipped with longitudinally extending walls affixed to it; vanes affixed to a shaft rotatably alternating in back and forth fashion; the shaft mounted upon double-walled end plates; four working chambers inside the casing, each chamber experiencing an intake, a compression, an ignition-expanding and lastly an exhaust cycle; four sets of ports, each set for intake of combustible fluid and exhaust thereafter; and four ignition means, one for each chamber.

However, the Barber engine is a four stroke engine only Barber fails to disclose ports for intake of combustible fluid and lubricating oil, seal strips and external valving means with an appropriate cam shaft.

Unlike the prior art systems, the present invention provides essentially only one moving element, its rotatably reciprocating vane piston. Because of pressure balancing on opposite sides of the vane members they may be constructed of lightweight material and the need for heavy bearing and counter-balancing means are virtually eliminated. The invention is capable of running on multiple types of conventionally available fuel and may conceivably be operated on multiple chambers or only two chambers two stroke cycles, one chamber two stroke cycles, or diesel cycles. The invention can also be designed and build as a pump or a compressor.

SUMMARY AND OBJECTS OF THE INVENTION

The multiple cylinder alternating vane rotary engine comprises a simple rotary vanes assemblage mounted within a plurality of cylindrical housings having fixed abutment walls and moving vanes and means for the intake and exhaust of combustible mixture. Between the vanes and the walls multiple chambers are formed, which change their volume. The chambers communicate between themselves via conduits, which carry fuel mixture from one chamber to another. Primary engine valving is accomplished by simple ports or apertures in the cylindrical housing and, or the end plates, also called heads, for the housing and by the reciprocating motion of the vane assemblage which opens and closes the apertures at the appropriate moment. The bi-directional rotation of the output shaft, upon which the vanes are mounted, may be made uni-directional by a well-known external gearing system.

The primary object of the present invention is to provide a rotary internal combustion engine, which quickly, efficiently and economically converts thermal energy into usable kinetic energy.

A further object of the present invention is to provide a power plant with essentially one moving element with concomitant savings in materials, weight, labor and manufacturing costs.

A further object of the present invention is to provide a rotary engine with operating vanes wherein the forces on opposite sides of the vanes are essentially balanced and the vibrations are virtually eliminated.

The accompanying drawings illustrate the preferred embodiments of the present invention and the principles of operation therefore. It should be recognized that other embodiments of the invention, applying the same or equivalent principles, may be utilized and structural changes may be made as desired by those skilled in the art, without departing from the spirit of the invention.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 7 shows schematically the engine with vane 7 thicker than vane 8;

FIG. 8 shows schematically the engine with vane 7 and wall 2 thicker than the corresponding vane 8 and wall 3;

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Figure 1:
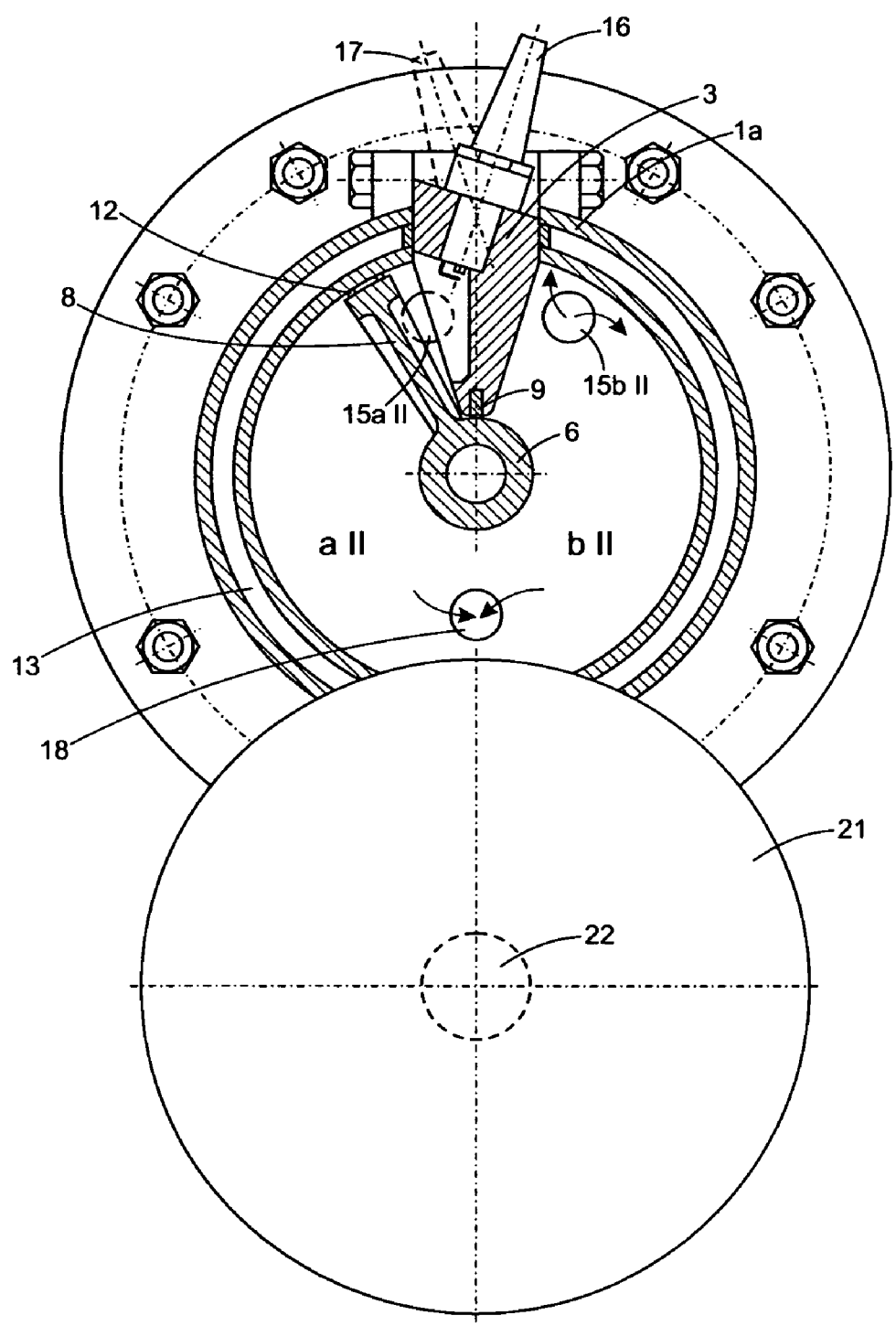
FIG. 1 is a frontal cutaway sectional view across the second cylinder of the instant alternating vane engine incorporating an essential swinging piston power output shaft, vanes and walls forming multiple chamber rooms inside a cylinder.
Figure 2:
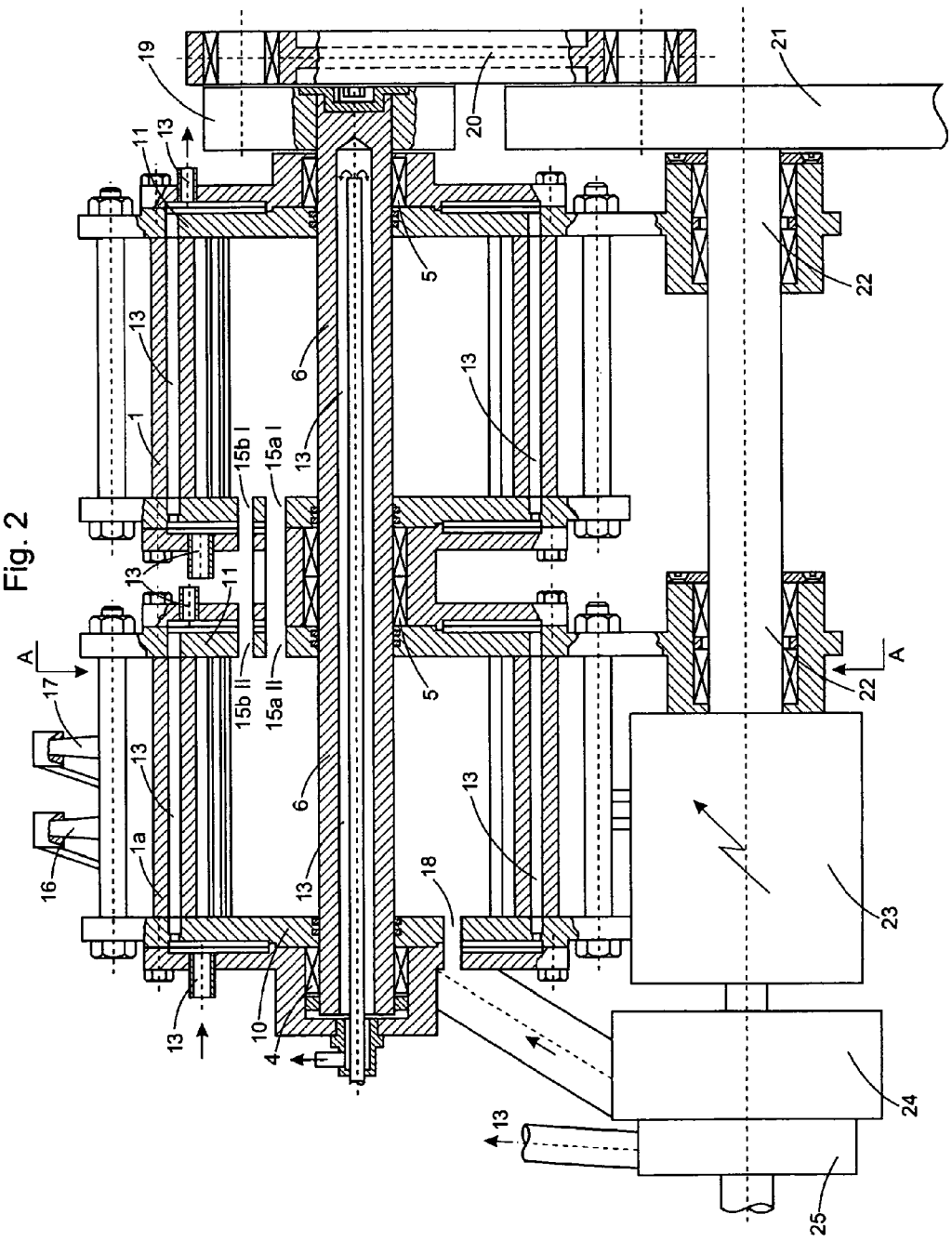
FIG. 2 schematically shows a cutaway cross section, side view of the engine taken along the vertical line passing through the axis of the swinging piston shaft of FIG. 1.
Figure 2A:
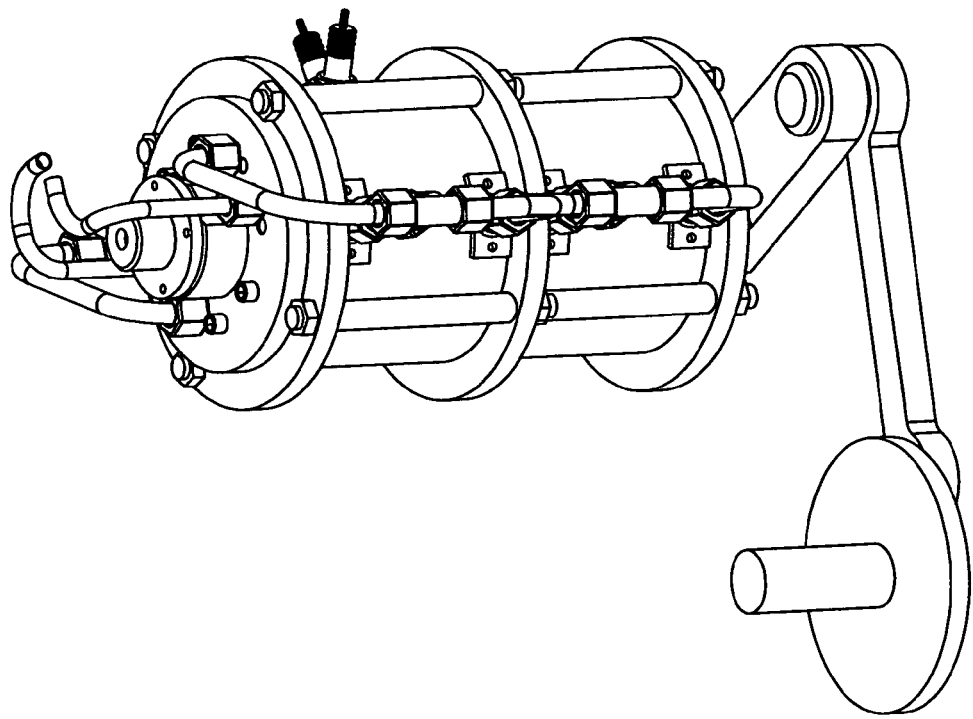
FIG. 2a is a perspective view of FIG. 2.

With reference to FIG. 1 in the drawings, the essential concept of the present invention and the means by which it is intended to operate may be appreciated. At 1a, a double-walled, water-jacketed, longitudinally extending cylindrical casing of cylinder II is shown, in section A-A (FIG. 2). In front of this casing, to the right, on the same shaft there is another, identical casing 1, referred as to the first casing. The first casing 1 is marked as cylinder I and the second casing 1a as cylinder II (FIG. 2). There may be multiple cylinders attached together on the same shaft. The casings may be conveniently made of aluminum, steel or other commonly used materials. The casings are equipped with longitudinally extended walls 2 and 3 (FIGS. 1&5), which can be unitary with, or affixed to the casings 1 and 1a. Wall 2 is attached to cylinder I and wall 3 to cylinder II. A rotary shaft 6 is suitably rotatably mounted within the casings upon end plates 10 and 11. The casings are shown in FIG. 2. The shaft is supported in the casings by commonly known bearing means 4 and 5 for mounting a rotary shaft in a motor, pump, or compressor. The shaft may be partially hollow to allow the flow of cooling fluids inside it.

Similar to the cylindrical casings the end plates 10 & 11 (FIG. 2) may be also double-walled to allow coolant to flow freely from the water pump 25 through all the cavities of the cylinders, the end plates and the shaft in a closed circuit 13.

Figure 3:
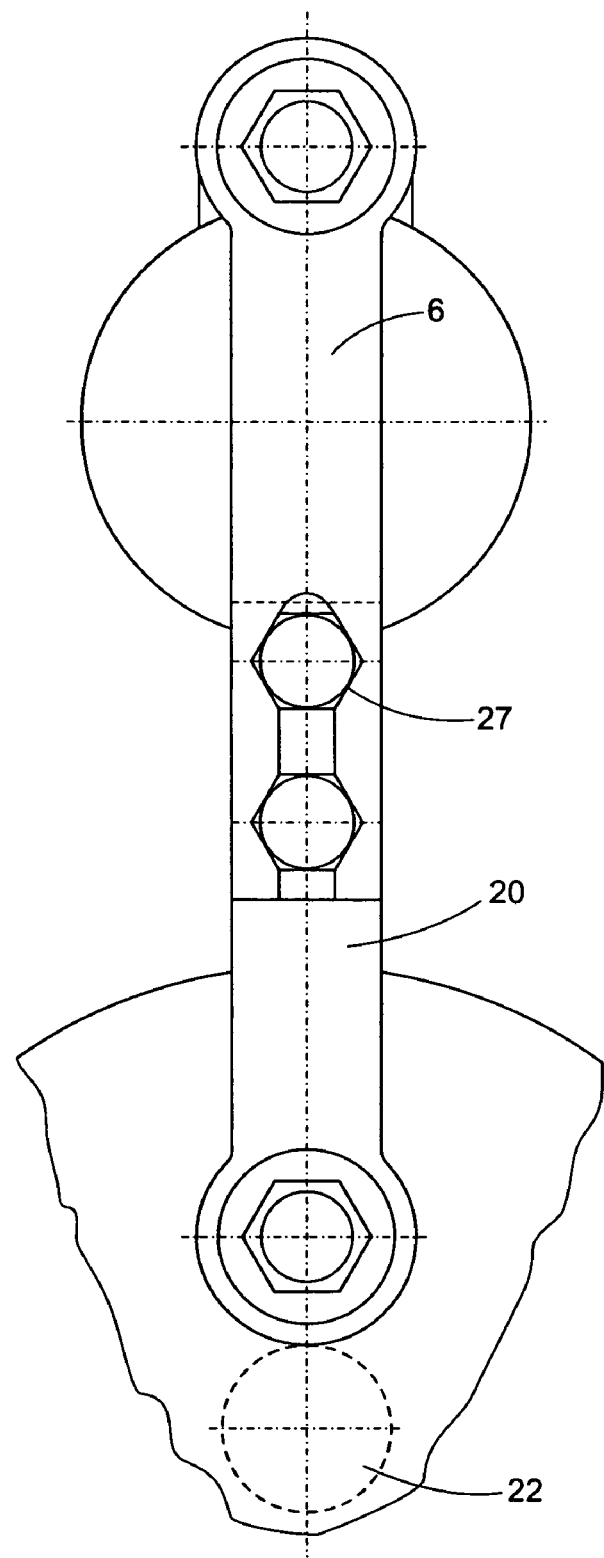
FIG. 3 shows a front view of an adjustable crankshaft assembly converting the alternating bi-directional rotary motion of the swinging piston output shaft 6 into a continuous unidirectional rotary motion of the main shaft 22.

FIG. 3 shows a front view of an alternating connecting rod assembly converting the alternating bi-directional rotary motion of the swinging piston output shaft 6 into a continuous unidirectional rotary motion of the main shaft 22. The break at 27 in the rod 20 allows for extending and adjusting the length of the rod according to the desired compression point inside the working chambers thus regulating the length of the stroke without the need of replacing the rod. The lower part of said rod is rotatably attached to the flywheel 21 via a slot on that flywheel and is affixed to it with a fastening member comprising a bolt and a nut. The slot allows for adjusting the length of the crank pin 20.

At 20 the lower end attachment of the crank pin is shown which is attached with its upper end to the crank pin 19 and with its lower end to the flywheel 21. The flywheel 21 is mounted on the main shaft 22, which then turns in only one direction.

Figure 4:
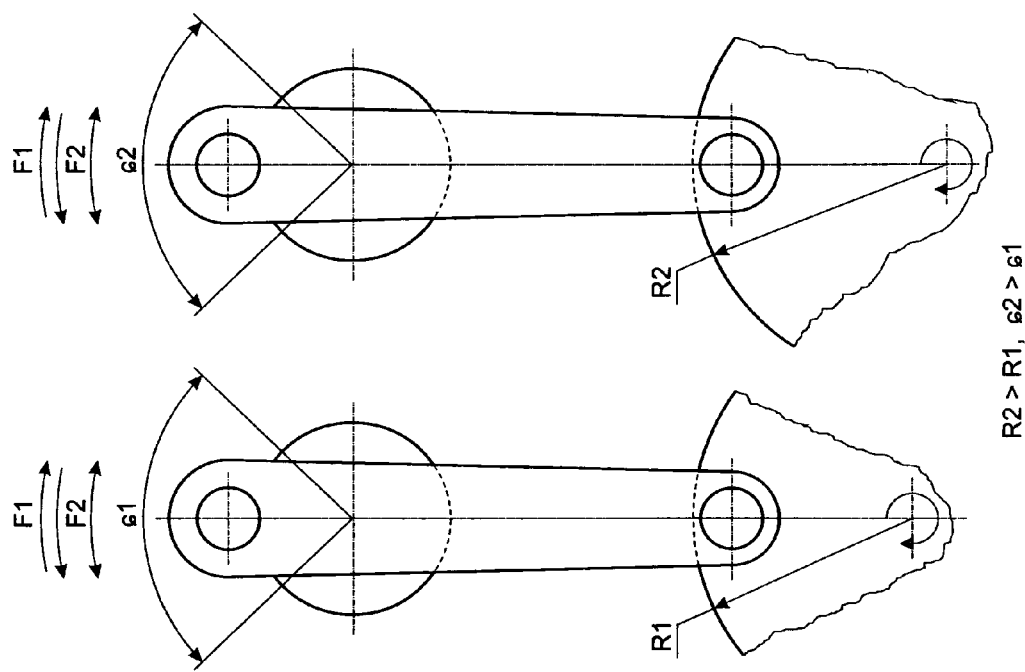
FIG. 4 shows the relation of the length of the radius R.sub.1 or R.sub.2 formed between the center of the main shaft 22 (FIG. 3) and the lower end attachment of the crank pin 20.
Figure 5:
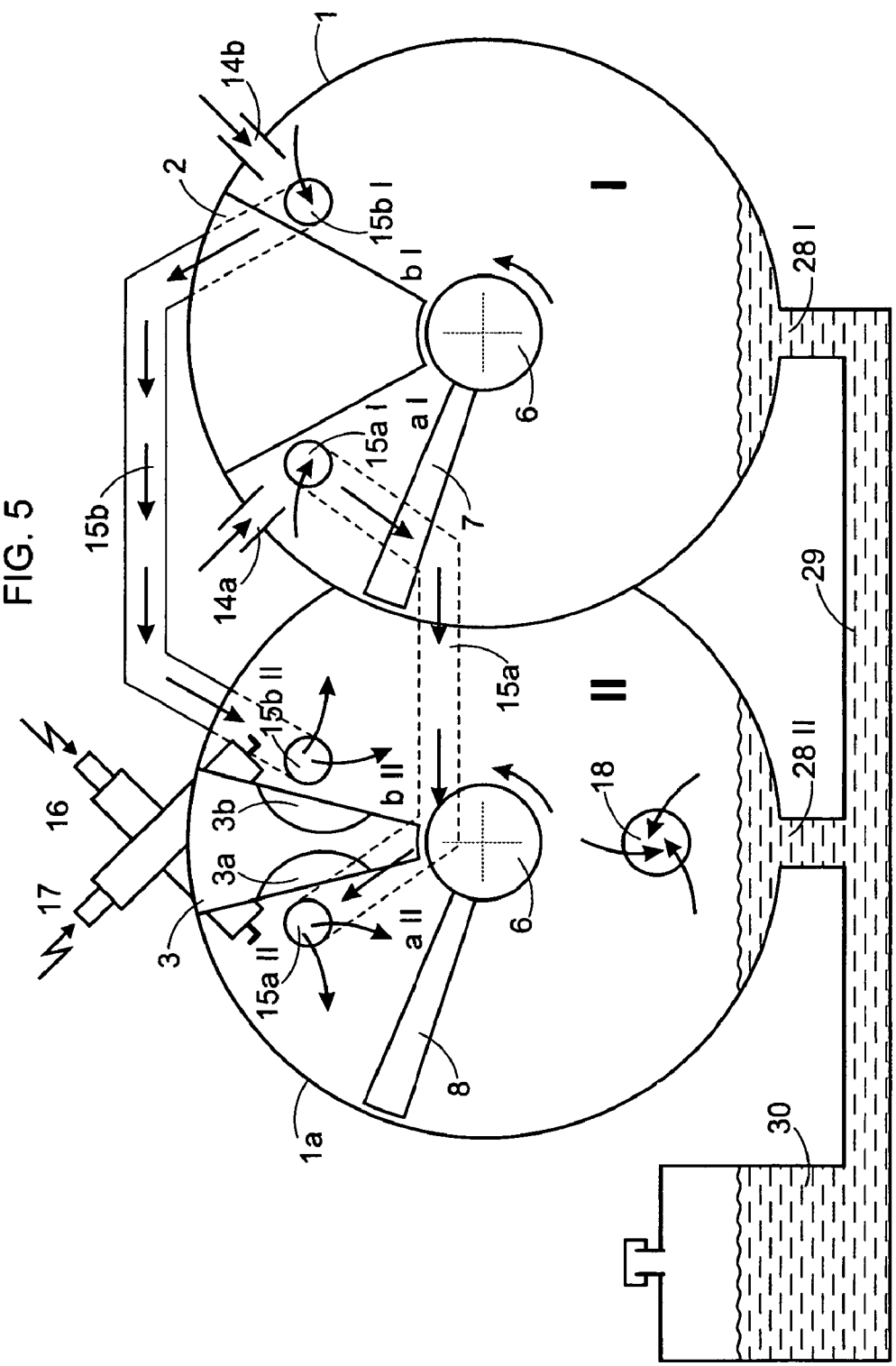
FIG. 5 shows the engine with wall 2 thicker than corresponding wall 3 and an oil container for lubrication connected to the bottom of cylinders I and II.

FIG. 4 shows schematically the relation of the length of the radius R.sub.1 or R.sub.2 formed between the center of the main shaft 22 (FIG. 3) and the lower end attachment of the crank pin 20 (FIG. 3) to the changing volume of the four chambers aI, bI and aII, bII formed by the swinging pistons inside the cylinders of the engine, in operation. A shorter crank pin creates a longer radius and causes the swinging pistons to increase their rotational angle allowing for a longer stroke thus instantly creating a higher compression inside the working chambers;

From FIG. 5 and on in the rest of the drawings the invention is shown schematically as a double-cylinder engine. The first cylinder marked as cylinder I, which is shown to the right is actually in front of the second cylinder shown as cylinder II to the left. Both cylinders are on the same axle and share the same shaft. Shown in this way we can see at the same time what is happening in the second cylinder, behind the first one, when the shaft 6 is turning.

Figure 6:
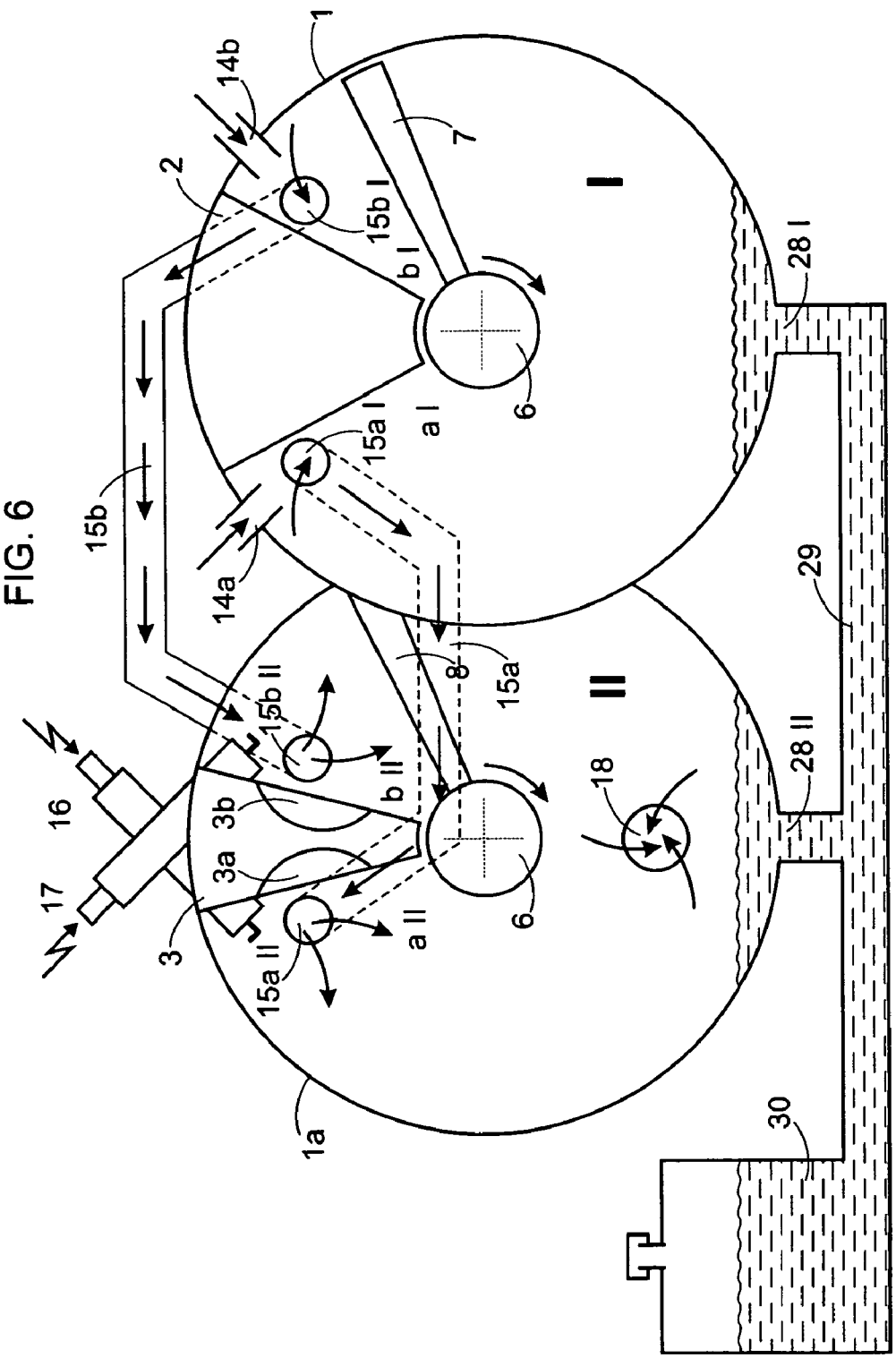
FIG. 6 is the same as FIG. 5 but the vanes 7 and 8 have moved to the right and are now reversing directions again.

Fixedly attached to, or unitary with the shaft 6 are rotating vanes 7, for cylinder I, and 8, for cylinder II. Suitable seals 9 and 12 are provided between the walls 2 and 3 and the shaft 6 and between the vanes 7 and 8 and the casings respectively. The vanes and the walls are of the same size except that the wall 2 is thicker then the corresponding wall 3 (FIGS. 5&6). This allows for the compression of combustible fuel mixture to occur in cylinder II since when both vanes alternate back and forth at the same time, smaller chambers are formed in cylinder I. This creates higher pressure in cylinder I and moves most of the mixture into the chambers of cylinder II since when the vane 7 tightly approaches the wall 2 on either side, there is still room left in the chambers of cylinder II for the compressed mixture to move there.

The casings are also equipped with plurality of ports 14a, 14b and 15aI, 15bI for cylinder I and 18, 15aII and 15bII for cylinder II (FIG. 5) which communicate between interior chambers aI, bI, and aII, bII formed, as shown, between the vanes 7 or 8 and the casings walls 2 or 3. These ports allow the intake (14a & 14b) of combustible fluids and lubricants, transfer of said fluids from cylinder I to cylinder II (via openings 15aI & 15bI and conduits 15a & 15b). Said fluids enter cylinder II via openings 15aII and 15bII. The exhaust thereof is enabled via port 18 from the said working chambers aII and bII of cylinder II. Port 18 is shared by both chambers aII & bII. Port 18 may also be equipped with one-way valve which opens only when the pressure inside the chambers is high enough. The intake ports 14a and 14b of cylinder I are each equipped with a one-way valve, which allows the flow of fluids only one-way into the chambers of cylinder II from cylinder I.

FIG. 2 also shows the side view of a connecting, alternating rod assembly converting the oscillating bi-directional rotary motion of the swinging pistons 7 & 8 and the output shaft 6 into a continuous unidirectional rotary motion of the main shaft 22. At 20 the lower end attachment of the crank pin is shown which is attached with its upper side to the crank pin 19 and with its lower side to the flywheel 21. The flywheel 21 is mounted on the main shaft 22, which turns in only one direction. At 24 a compressor, a carburetor or an injection means delivers fuel mixture into the engine. The intake ports 14a & 14b (FIG. 5) may be replaced by injection means. At 23 a box is shown, containing the electrical and electronic systems of the engine. 25 is a water pump.

There are two ignition means for cylinder II, preferably comprising spark plugs, shown schematically at 16, 17. The precise details of the ignition means, the valving means and the seals are not, in themselves subject of the present invention and various types of such known components could be used provided that the operative characteristics, in combination, are set forth. For example, Wankel type seals could be utilized.

The particular mode of operation of the invention will be now described as we turn our attention to FIG. 5. As the power output shaft 6 turns back and forth, the vanes 7 and 8, which are both connected to said shaft, rotate simultaneously clockwise and counterclockwise. In so moving the vanes continuously change the volume of the chambers aI & bI and aII & bII respectively. The vane 7 or the wall 2 or both of them are thicker then the corresponding vane 8 or wall 3 of cylinder II. This makes chambers aI and bI smaller then the corresponding chambers aII and bII. Since the corresponding chambers are connected this allows a higher pressure to build intermittently in chambers aI or bI of cylinder I when vane 7 is approaching wall 2 from either side and causes the combustible fuel mixture to move all the way into chambers aII or bII of cylinder II when the engine is operating.

In a two-stroke, four chamber operation the engine works as follows. In the position of the vanes shown in FIG. 1 and FIG. 5, vanes 7 & 8 are moving in counterclockwise direction and air-fuel mixture and lubricant are being drawn in through port 14a to the expanding chamber aI of cylinder I after the vane 7 moves past this port creating a vacuum inside said chamber. At the same time chamber aII of cylinder II is expanding too as vane 8 moves counterclockwise simultaneously with vane 7. Ports 14a and 14b are connected to one-way valves and said ports only work as intake ports. The one-way valves open to allow the intake of fuel mixture when there is low pressure in a particular chamber. They close when there is high pressure in the same chamber.

Simultaneous with the expansions of the chambers aI & aII are the contractions of the chambers bI & bII. The previously drawn combustible fluid mixture in chamber bI is being compressed by the vane 7 against the wall 2. This combustible fluid now under pressure exits chamber bI through the exit port 15bI and via conduit 15b moves into chamber bII of cylinder II through port 15bII. Inside the conduit 15b there is a one-way valve which opens when there is high pressure in chamber bI and allows the fluid mixture to move in only one direction from cylinder I to cylinder II. Since vane 8 moves simultaneously with vane 7, said vane 8 compresses against wall 3 the fuel delivered from chamber bI into chamber bII.

At a predetermined maximum compression point in chamber bII ignition means 17 fires and causes vanes 8, and vane 7 also, to rotate together in the opposite direction, now clockwise (FIG. 6), with concomitant expansion of chambers bII and bI. The burned exhaust gases in chamber bII are now free to leave said chamber through the exhaust port 18, after the vane 8 moves past this port. Port 18 again is connected to a one-way valve, which only opens when there is enough pressure inside the chambers aII or bII created by the explosions of the burning gases inside said chambers. Since the vane 7 also moves now in clockwise direction new fuel mixture and lubricant is being drawn in chamber bI via port 14b.

In its clockwise direction vane 7 compresses the previously drawn in fuel mixture in chamber aI against the wall 2 and moves it via the opening 15aI and conduit 15a into chamber aII of cylinder II. Said fuel mixture is being compressed there by the vane 8 which squeezes it towards the wall 3. At a predetermined maximum compression ignition means 16 fires and the following explosion reverses again the direction of motion of vane 8 together with vane 7.

After vane 8, (back to FIG. 5) in its counterclockwise direction now, moves past the exhaust port 18, the burned gases leave chamber aII and vane 8 compresses now on the other side the new gases which are simultaneously moving into chamber bII from chamber bI pushed by vane 7. At maximum compression ignition means 17 fires again and the vanes reverse direction. At maximum compression, the igniters fire sequentially, as described above and each time the vanes repeatedly reverse direction, keeping the engine operating.

FIGS. 5 & 6 also shows a lubrication mechanism located on the bottom of the engine. A reservoir of oil 30 is connected via conduit 29 and openings 28I and 28II to the bottom of cylinders I and II. Oil moves from said reservoir 30 into the engine's chambers and when the vanes 7 & 8 oscillate they enter the oil that is collected on the bottom of said chambers and spread it around on the inside surface of the cylinders thus lubricating the interior of the engine's casings.

In an embodiment of FIG. 7 both walls may be of the same size but the first vane 7 may be thicker than the second vane 8. Yet in a different embodiment of FIG. 8 both, the vane 7 and the wall 2 of cylinder I may be bigger in size compared to the vane 8 and the wall 3 of cylinder II. In FIGS. 7 & 8 cavities are created on both sides of the vane or on the wall of cylinder II in order to enlarge the volume of appropriate chambers of said cylinder.

Figure 9A:
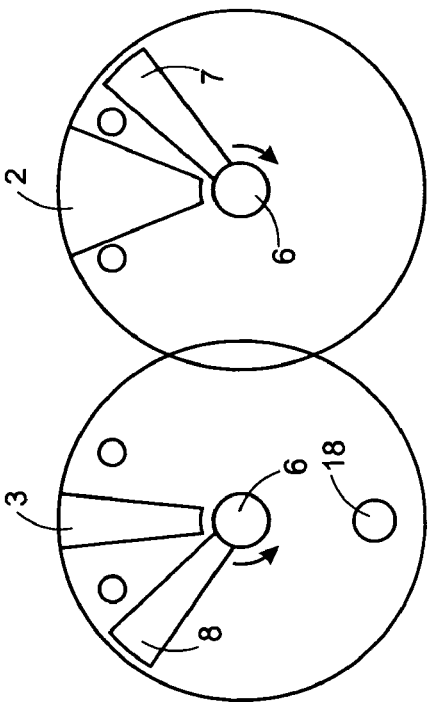
FIGS. 9a, 9b and 9c show schematically the engine with the vanes 7 and 8 moving in opposite directions of each other.
Figure 9B:
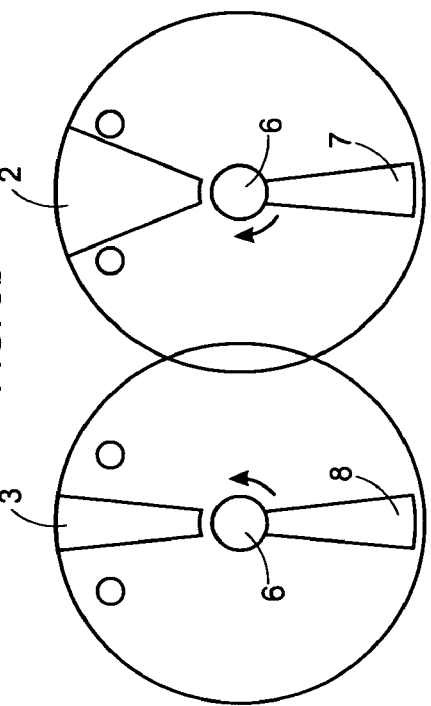
Figure 9C:
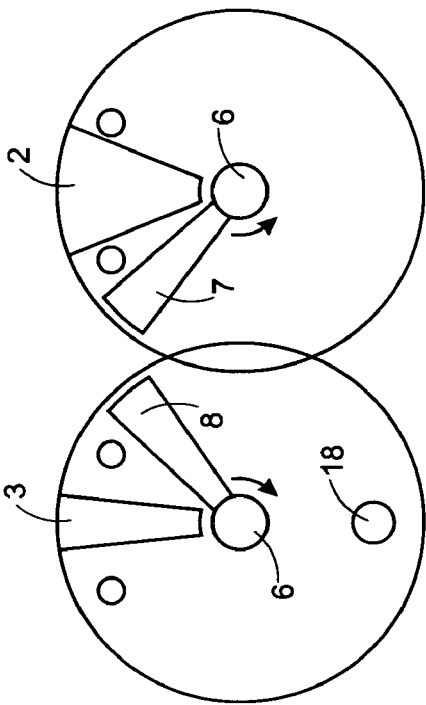

FIGS. 9a, 9b & 9c show an embodiment of the engine in which vanes 7 and 8 move in the opposite direction. In FIG. 9a vane 7 moves clockwise while vane 8 moves counterclockwise. In FIG. 9b both vanes are in down position, in the middle of their motion when they cross each other. In FIG. 9c both vanes have reached the upper point where the maximum compression occurs and are reversing their direction after a spark from the igniter 17 causes an explosion in chamber bII.

The reason for this arrangement is that in larger engines the motion of the vanes in the same direction may create vibrations due to the alternating motion of the larger masses of the vanes and the crank pins. If the vanes and thus the crank pins move in is the opposite direction, they would cancel each other thus no vibration will be produced.

When the vanes move in opposite direction as shown in FIGS. 9, 9a & 9b, everything is the same as in the previous embodiments except that the corresponding chambers are crossed over. Now the compressed fuel mixture from chamber bI of cylinder I is delivered into chamber aII of cylinder II and the mixture from chamber aI goes into bII.

Figure 10:
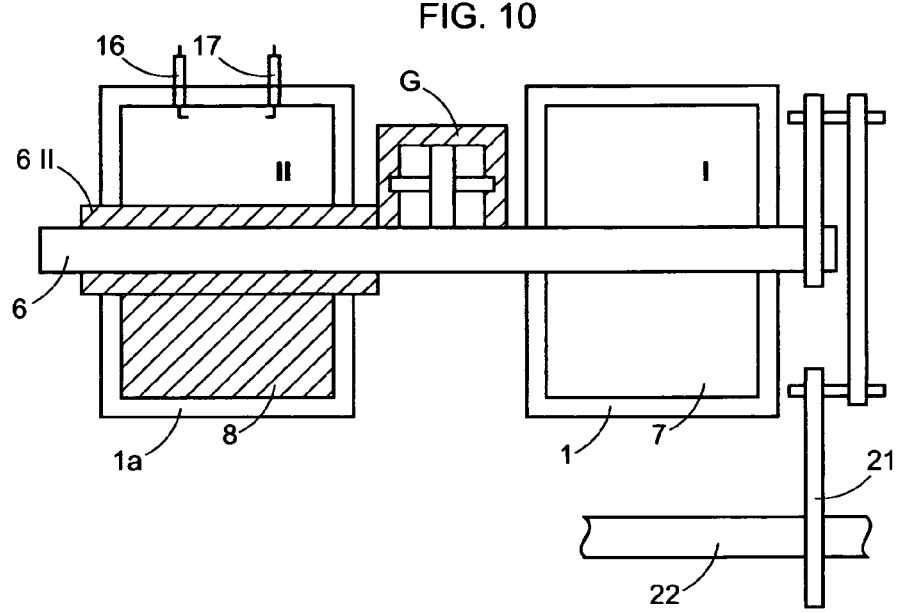
FIG. 10 shows a gearing mechanism G on shaft 6 in the middle between the two cylinders, which enables the two vanes to move in the opposite direction when oscillating.
Figure 10A:
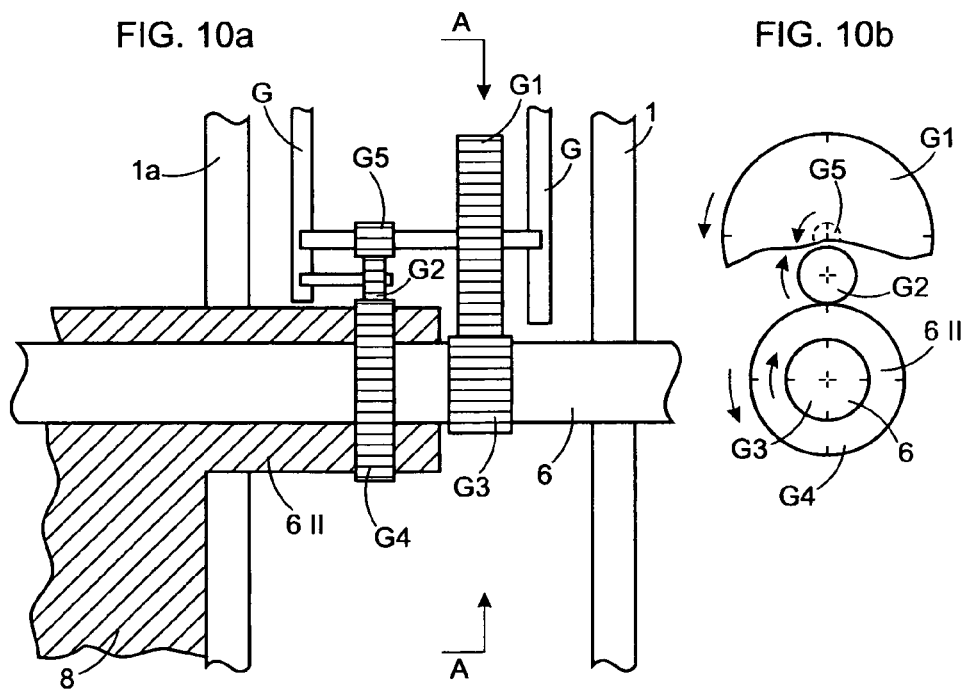
FIG. 10a is an enlargement of the gearing mechanism G of FIG. 10.
Figure 10B:
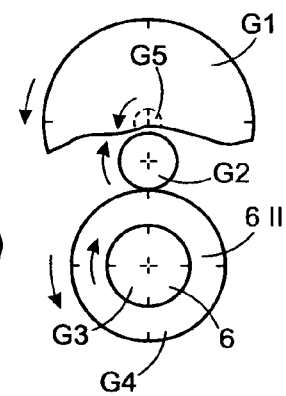
FIG. 10b is a front view of the gearing mechanism of FIG. 10a taken along the axis A-A.

In FIG. 10, on shaft 6 in the middle between the two cylinders, the present invention utilizes a gearing mechanism, which enables the two vanes to move in the opposite direction when oscillating. The gearing mechanism consists of a gearbox G for a simultaneous reverse motion as schematically shown in the enlargement in FIG. 10a. FIG. 10b shows schematically a cutaway cross section front view of the gearbox taken along the vertical line A-A passing through the axis 6 on FIG. 10a. A gearwheel G3 is firmly attached around the axle 6 and rotatably touching gearwheel G1. When vane 7 and thus axle 6 are turning in clockwise direction, as indicated by the arrow, gearwheel G1 is turning in the opposite direction. Said gearwheel then turns gearwheel G2 in the opposite direction, again clockwise, via gearwheel G5 affixed to the same axle as G1. Finally gearwheel G2 turns the hollow axle 6II of cylinder II in the opposite, counterclockwise direction via gearwheel G4 fixedly attached to said axle. The hollow axle 6II is independent of axle 6 and is attached to vane 8, which now always moves in a direction opposite to vane 7.

Figure 11:
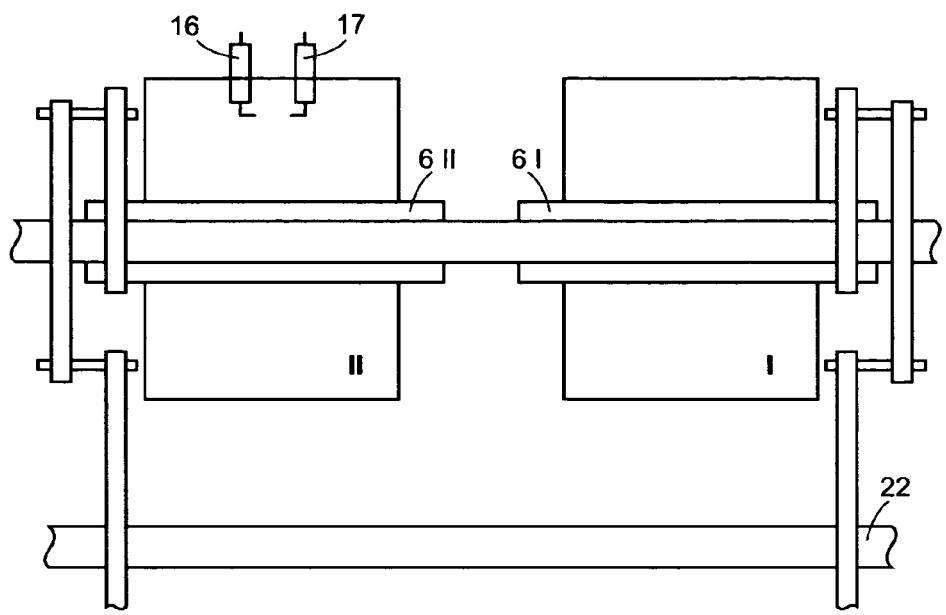
FIG. 11 shows a different arrangement of the embodiment of FIGS. 9a, 9b & 9c, where on each cylinder one crankshaft assembly is attached, each vane having a hollow shaft independent of the other.

In FIG. 11, in a different arrangement of the embodiment of FIGS. 9, 9a & 9b, two crankshaft assemblies on both sides of the engine are attached. Axle 6 is independent of the motion of the vanes and each vane consists of a hollow shaft inside which said axle 6 goes through. Each hollow shaft 6I and 6II is directly attached to each crankshaft. The two crankshafts may be mounted one on each end of the engine, as depicted in FIG. 11 or, just one crankshaft may be located in the middle, between the two cylinders with a split set of crank pins for each vane and with each vane having a hollow shaft independent of the other.

Figure 11A:
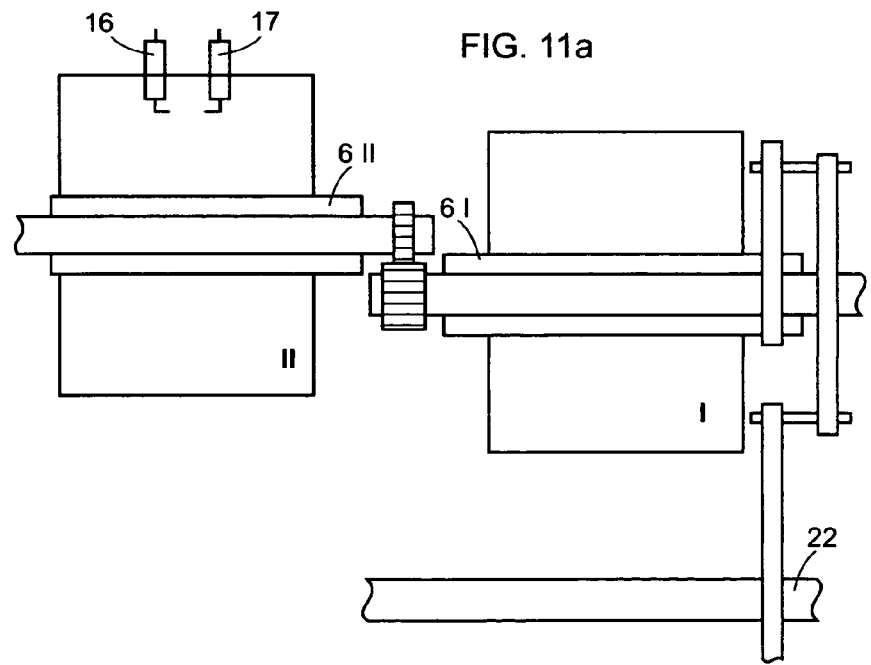
FIG. 11a shows the power output shaft 6 divided in the middle and the two inside ends between the two cylinders overlapping each other and turning in opposite directions.

In FIG. 11a the output shaft 6 is divided in the middle and the two inside ends between the two cylinders overlap each other. Each end is rotatably connected to the other via gearwheels of the same size, which enable each shaft and thus each vane to turn in the opposite direction.

Figure 11B:
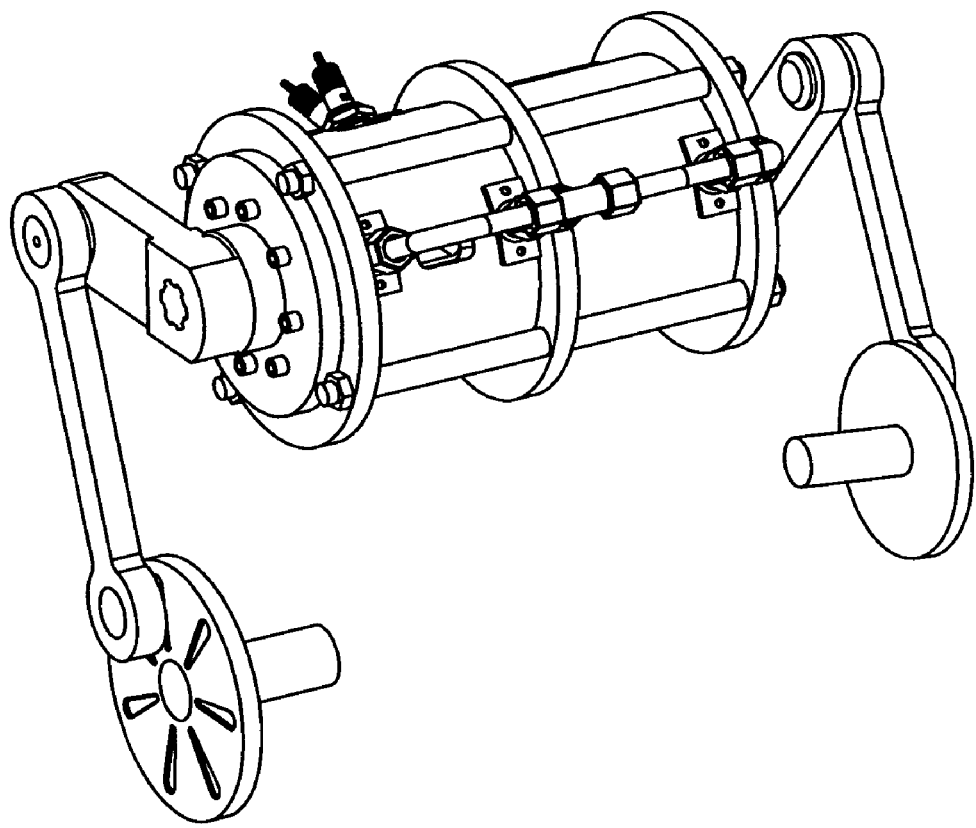
FIG. 11b is a perspective view of the engine of FIG. 11.
Figure 12:
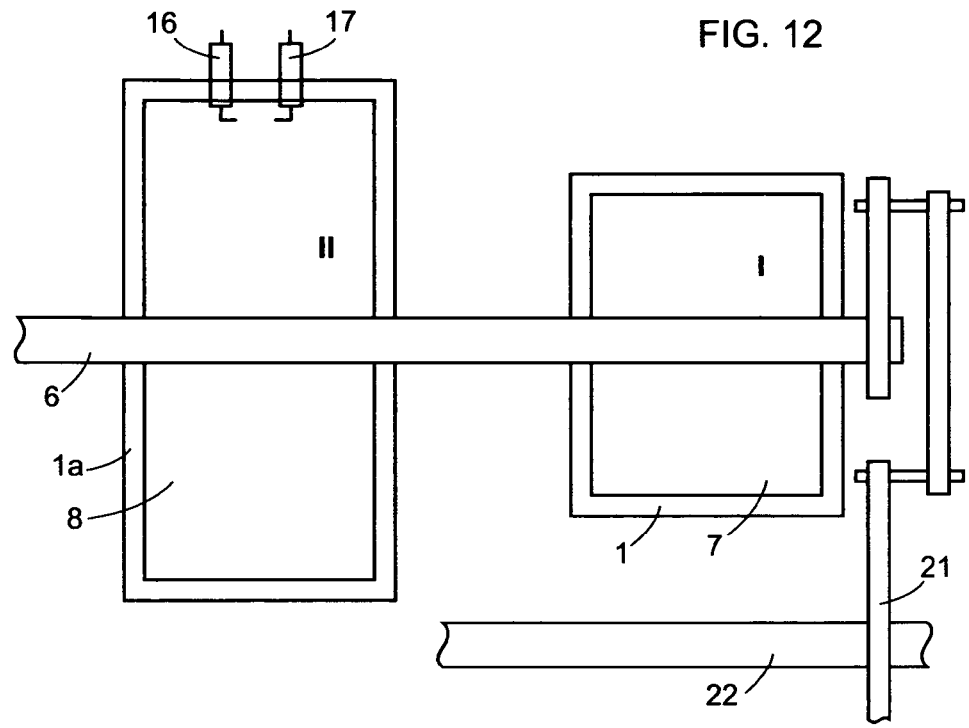
FIG. 12 shows an embodiment in which cylinder II is bigger in diameter then cylinder I.

FIG. 11b is a perspective view of the engine of FIG. 11;

In FIG. 12 an embodiment is shown in which cylinder II is bigger in diameter then cylinder I. This again, just like the cavities, creates bigger chambers in cylinder II and allows the fuel mixture to move easily from cylinder I into cylinder II where it is compressed and ignited.

Figure 13:
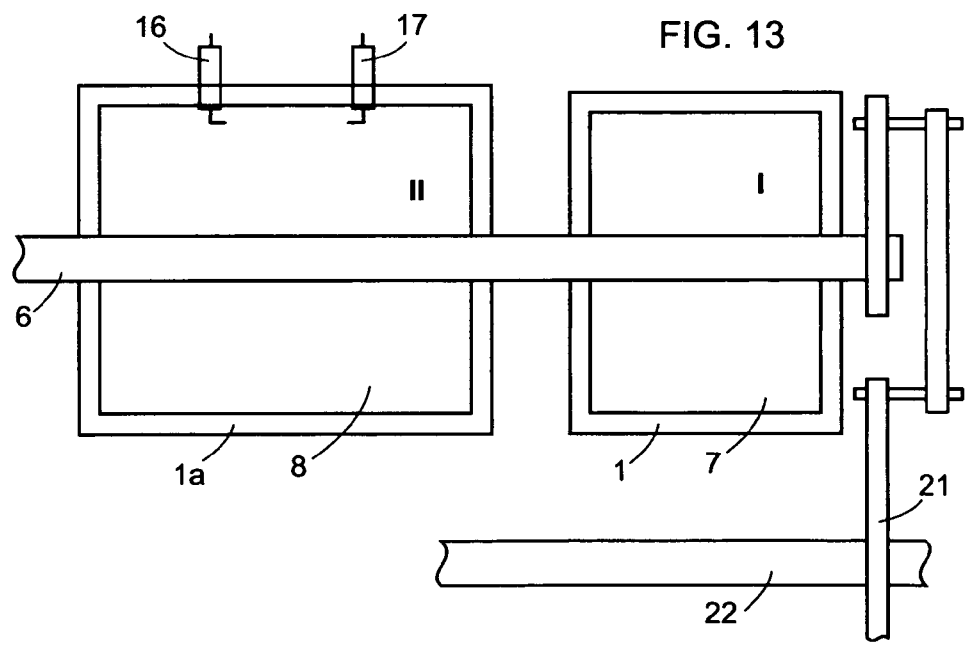
FIG. 13 shows an embodiment in which cylinder II is of the same diameter as cylinder I but it is longer in length.

In FIG. 13 an embodiment is shown in which cylinder II is of the same diameter as cylinder I but it is longer in length. This creates larger chambers in cylinder II and allows the fuel mixture to move easily from cylinder I into cylinder II where it is compressed and ignited.

Figure 14:
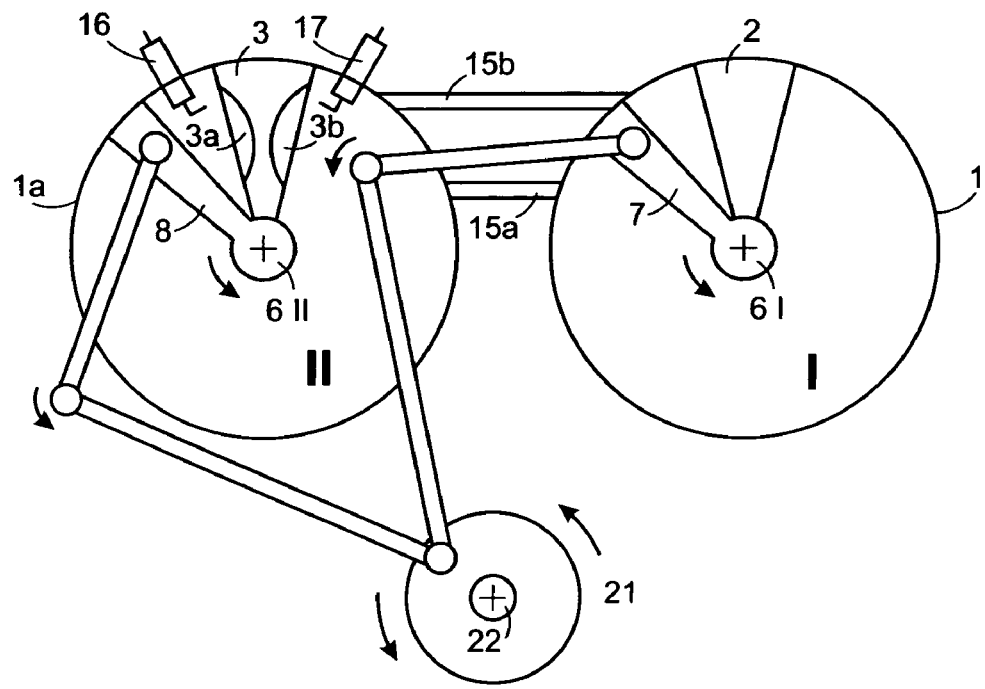
FIGS. 14a and 15a show a top view of FIGS. 14, 15.
Figure 15:
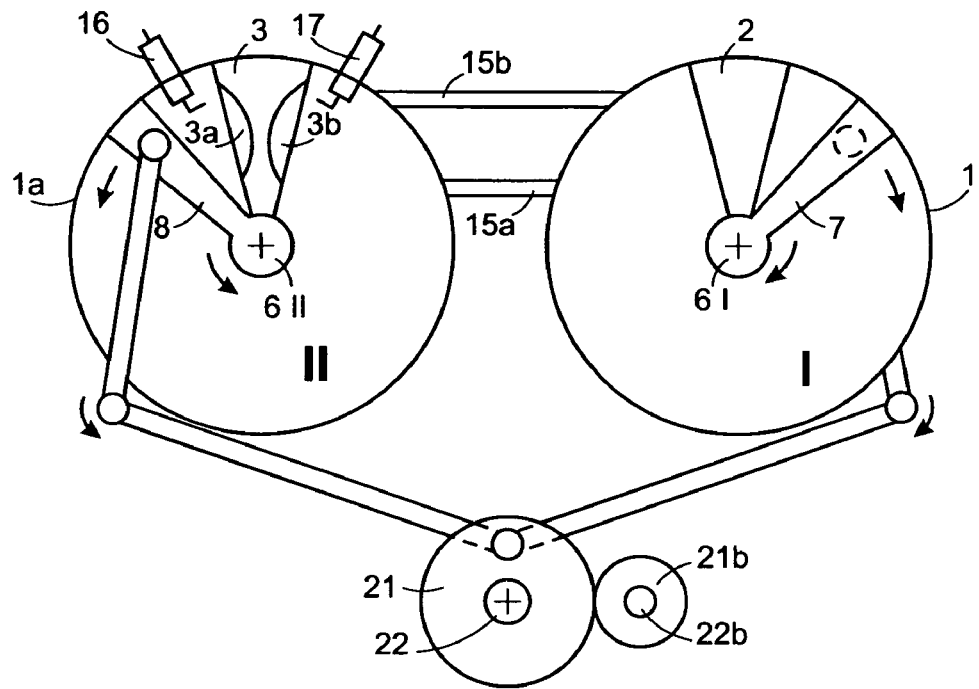

FIGS. 14 and 15 schematically show a front view of two cylinders I and II where said cylinders are arranged and connected parallel next to each other as opposed to the previous embodiments where they are arranged sequentially, in a row on the same shaft. Here, each cylinder has its own shaft 6I and 6II, each shaft independent of the other. There is a set of crank pins attached to each shaft, which together with the flywheel 21 form a crankshaft. Both sets of crank pins, together with the vanes, turn simultaneously either in the same direction FIG. 14 or in the opposite direction FIG. 15. At their lower ends each set of crank pins is attached to the common main shaft 22 with the flywheel 21, which turns in one direction only.

Figure 14A:
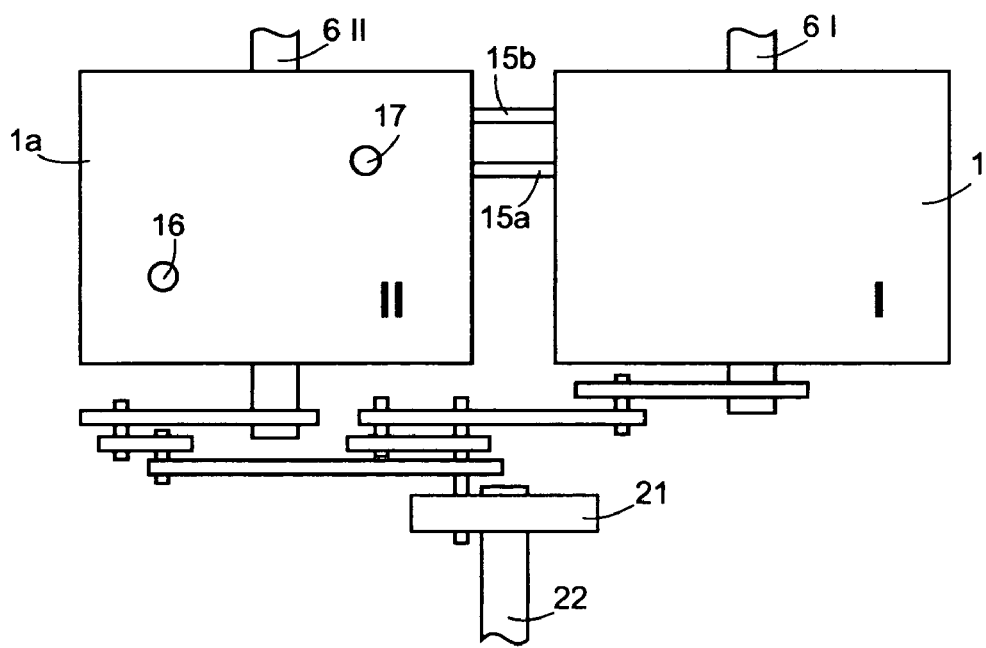
Figure 15A:
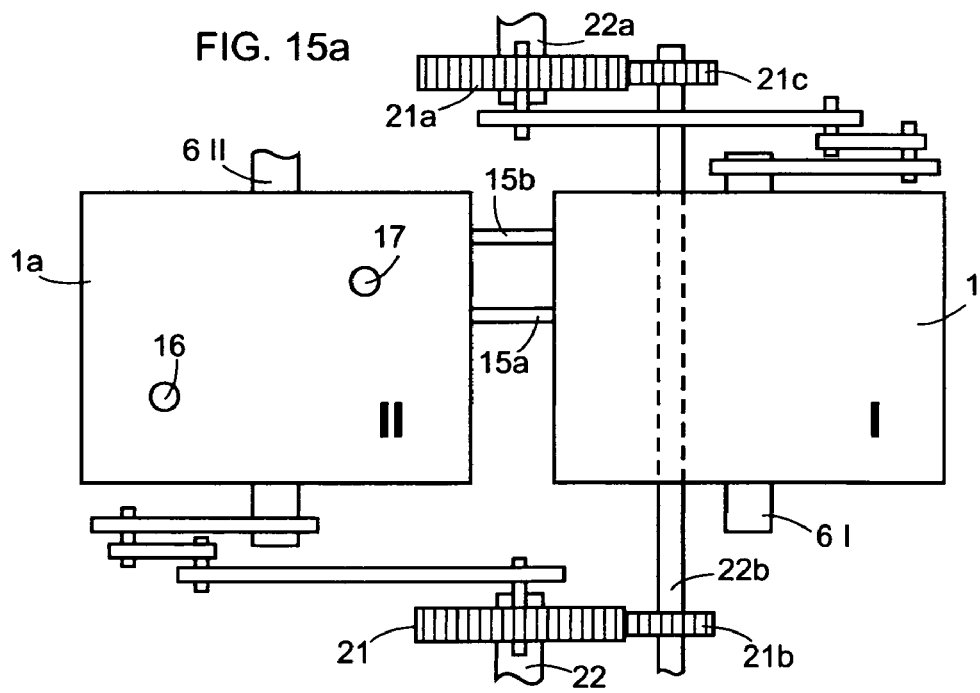

FIGS. 14a and 15a show a top view of the embodiments shown in FIGS. 14 and 15.

In FIGS. 15 and 15a the axle 22b with gearwheels 21b & 21c is movably connected to gearwheels on the flywheels 21 & 21a. Said axle synchronizes the motion of the two crankshafts and the two vanes 7 & 8 as they turn in the opposite direction.

If the two sets of crank pins and the two vanes turn in the same direction, as in FIG. 14, the engine works as described for FIGS. 5 & 6. If the two sets of crank pins turn in the opposite direction as in FIG. 15, 16 the engine works as described in FIGS. 9, 9a & 9b.

Figure 16:
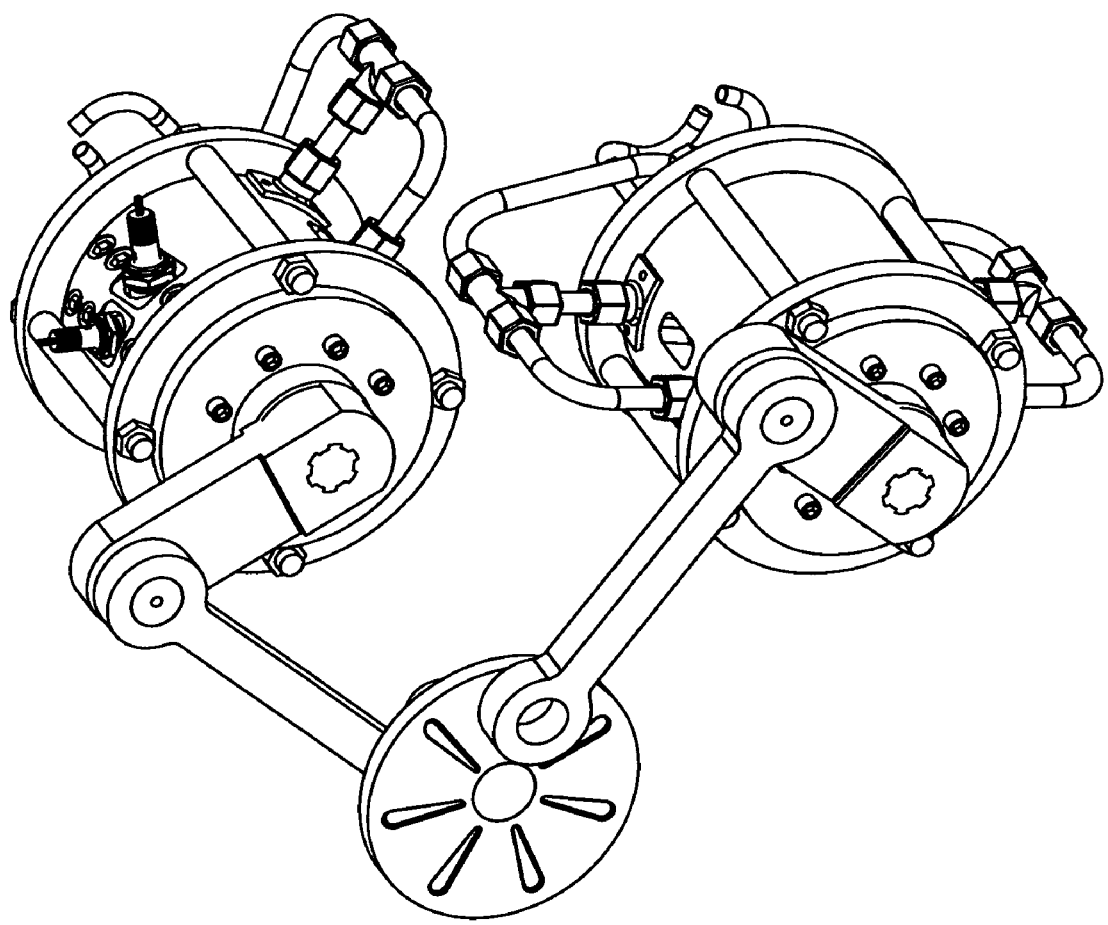
FIG. 16 is a perspective view of FIG. 14.

FIG. 16 is a perspective view of FIG. 14.

Figure 17:
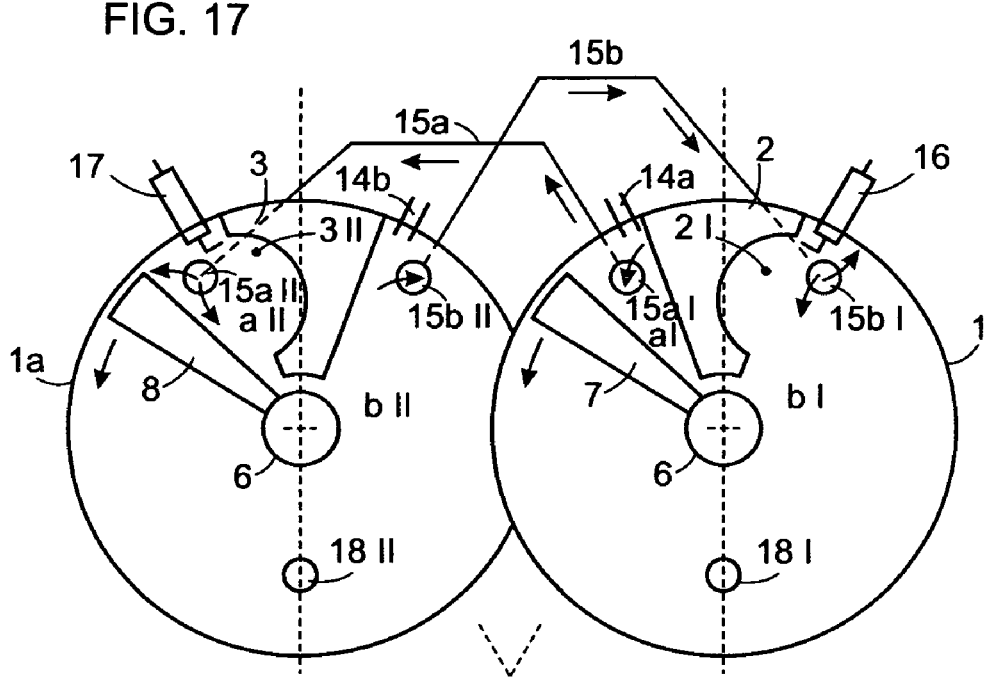
FIGS. 17, 17a and 17b schematically show an embodiment of the engine where each cylinder has one working chamber and one charging chamber. The two cylinders have one spark plug each, 16 & 17.

FIG. 17 schematically shows an embodiment of the engine with one working chamber, bI & aII and one charging chamber, aI & bII for each cylinder. There is one intake port and one exhaust port for each cylinder. The two cylinders have one spark plug each, 16 & 17.

In FIG. 17 everything moves in exactly the same way as in the embodiments of FIGS. 5 & 6 except that the first cylinder charges with fuel mixture the second and then the second cylinder charges the first. When vane 7 approaches wall 2, the previously drawn in fuel mixture in chamber aI of cylinder I moves via conduit 15a into chamber aII of cylinder II where it is compressed by vane 8 which moves simultaneously with vane 7 in clockwise direction. After the spark plug 17 fires, vane 8 reverses direction and moves counterclockwise and pushes the previously drawn fuel mixture from chamber bII into chamber bI of cylinder I, via conduit 15b. The mixture is compressed here by vane 7 and after the spark plug 16 fires said vane reverses direction again. The spark plugs fire sequentially one after the other in order to keep the engine operating. The two working or ignition chambers are larger in volume than the charging chambers enabling the fuel mixture to move from the charging chambers into the working chambers. To achieve this, there is one cavity 2I and 3II on each wall, facing the working chamber.

Figure 17A:
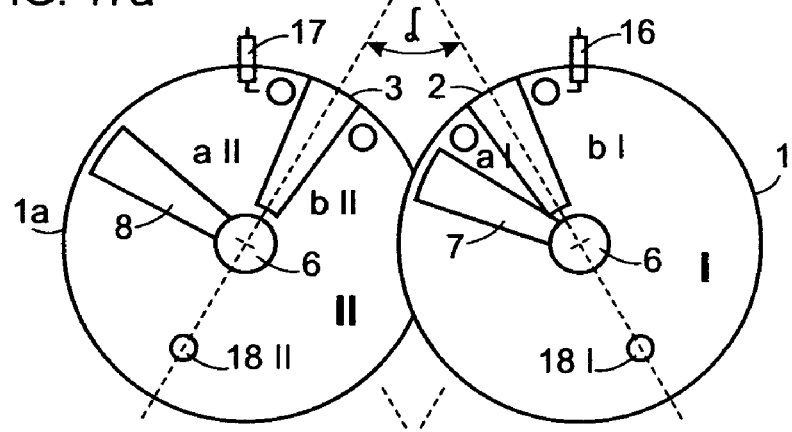
Figure 17B:
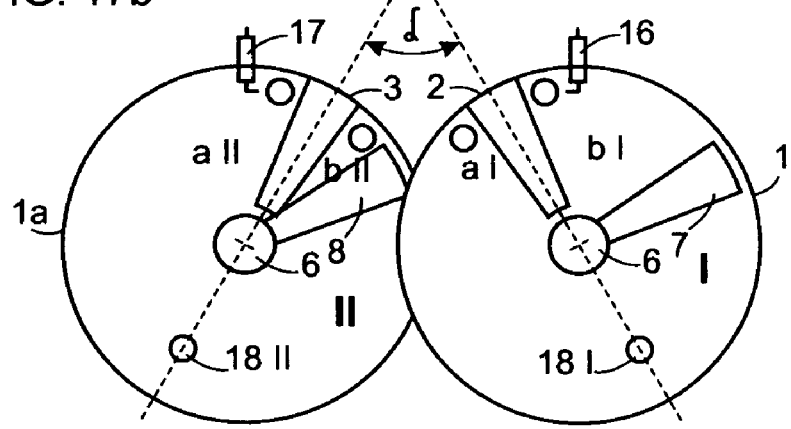

Another way of expanding the working chambers is shown in FIGS. 17a & 17b. Here, the two walls 2 & 3 of the two cylinders are of the same size and may have no cavities but are tilted proportionally to the left and to the right from the vertical axis passing through the axle 6 of FIG. 17. This allows for a predetermined enlargement of the working chambers along with a shrinking of the charging chambers when the shaft 6 is swinging together with the pistons 7 & 8. Thus the angle alpha formed between the two vertical axis of each cylinder controls the compression step of the swinging vanes and allows for a predetermined, or subsequently anytime adjustable, level of the compression stroke. The wider said angle is, the smaller the compression step of the swinging pistons is because the working chambers become larger. At the same time the charging chambers become smaller and more fluid mixture moves from them into the working chambers.

In a different embodiment of the engine two or more ignition (working) cylinders may be directly attached to one charging cylinder or two or more charging cylinders may be attached to one working cylinder.

Figure 18:
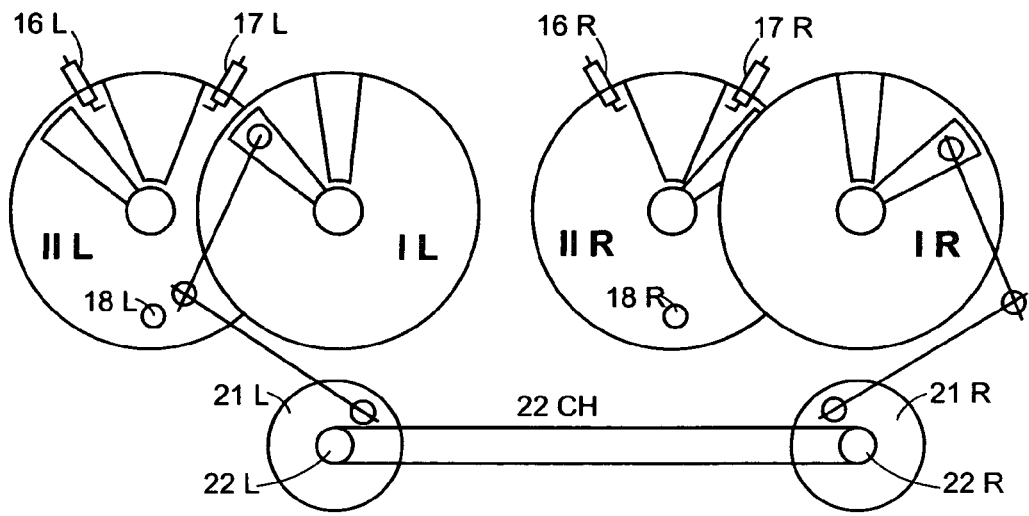
FIGS. 18 and 18a show an assembly of two engines parallel to each other, with crankshafts and pistons turning in opposite directions in order to eliminate the vibrations. A chain is attached to the main shaft of each engine synchronizing their motion.
Figure 18A:
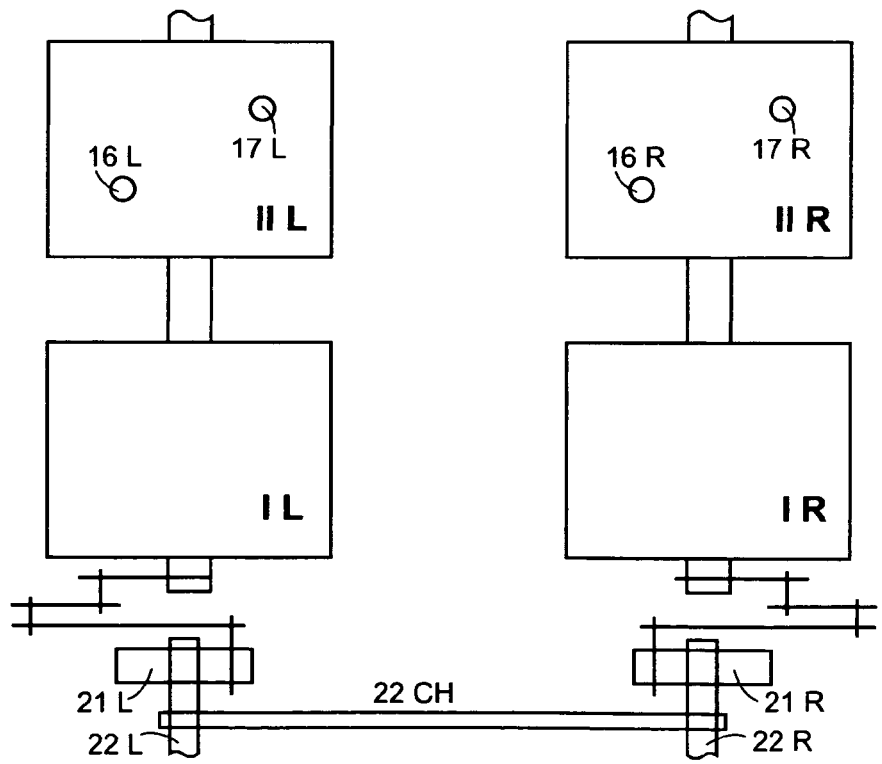

FIGS. 18 and 18a show an assembly of two engines, each with a double-cylinder on one axle, one on the left and one on the right side, connected parallel to each other. In each couple of cylinders one cylinder is charging and the other is working. The crankshafts and the pistons of each engine are turning and simultaneously alternating back and forth in opposite directions in order to eliminate vibrations. A chain 22ch is attached to the main shaft of each engine synchronizing their motions.

The invention claimed is:

1. A rotatably reciprocating multi-cylinder vane internal combustion engine comprising:
    a multitude of cylindrical casings;
    longitudinally extending walls being affixed inside said casings;
    end plates for each casing;
    power output rotary shafts mounted within said casings upon said end plates, affixed to swinging vanes;
    a multitude of chambers, two inside each cylindrical casing, formed between said longitudinally extending walls and between said vanes, working in a combination of couples and complementing each other as one charging and one ignition chamber;
        wherein said vanes rotatably alternate in back and forth fashion in such a manner that the volume of said chambers between said vanes and the walls compresses and expands in a sequence of a two-stroke mode in which the internal combustion engine operates;
        wherein each one of charging chambers is sequentially operating in a stroke of intake of combustible fuel-air mixture, and then in a reversed stroke of expulsion of said mixture;
        said each one of the charging chambers further comprising:
            intake ports for an additional fuel mixture;
            exit ports and conduits connected to said exit ports for transfer of said additional fuel mixture into the ignition chambers;
        wherein each one of ignition chambers burns the compressed fuel-air mixture;
        said each one of the ignition chambers further comprising:
            intake ports connected to said conduits for delivering of said additional fuel mixture from said corresponding charging chamber; and
            exhaust ports for the exit of the burned gases thereafter;
        wherein each one of said working chambers contains ignition means which fire sequentially therefore operating said engine in strokes of intake-and-compression, and then in reversed strokes of expulsion-and-exhaust.

2. The rotatably reciprocating multi-cylinder vane internal combustion engine according to claim 1:
    wherein said walls of said ignition chambers includes at least one of being a smaller size than said corresponding walls of said charging chambers, or having cavities;
    wherein said vanes of said ignition chambers includes at least one of being a smaller size than said corresponding walls of said charging chambers, and having cavities; and
    wherein said walls and said vanes of said ignition chambers includes at least one of being a smaller size than said corresponding walls and vanes of said charging chambers, or having cavities, thereby reducing the volume of said ignition chambers, enabling the fuel mixture to move entirely from said charging chambers into said ignition chambers.

3. The rotatably reciprocating multi-cylinder vane internal combustion engine according to claim 1 wherein:
    said charging chambers has at least one of a smaller diameter and a shorter length then said ignition chambers, thereby the volume of charging chambers is smaller compared to the volume of said ignition chambers.

4. The rotatably reciprocating multi-cylinder vane internal combustion engine according to claim 1 comprising:
    oil container for lubrication, connected to said engine's casings via conduits and openings on the bottom of the casings.

5. The rotatably reciprocating multi-cylinder vane internal combustion engine according to claim 1 comprising:
    crankshaft mechanisms connected to said rotatably reciprocating power output shafts for converting a bi-directional rotation into one-directional rotation.

\* \* \* \* \*